United States Patent
Miyake (10) Patent No.: US 10,436,260 B2
(45) Date of Patent: Oct. 8, 2019

(54) SELECTABLE ONE-WAY CLUTCH

(71) Applicant: TOYOTA JIDOSHA KABUSHIKI KAISHA, Toyota-shi, Aichi-ken (JP)

(72) Inventor: Kouhei Miyake, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 470 days.

(21) Appl. No.: 15/383,580

(22) Filed: Dec. 19, 2016

(65) Prior Publication Data

US 2017/0198762 A1   Jul. 13, 2017

(30) Foreign Application Priority Data

Jan. 7, 2016  (JP) .................. 2016-001683

(51) Int. Cl.
 *F16D 41/12* (2006.01)
 *F16D 41/14* (2006.01)
(52) U.S. Cl.
 CPC ........... *F16D 41/125* (2013.01); *F16D 41/14* (2013.01); *F16D 2300/06* (2013.01)
(58) Field of Classification Search
 None
 See application file for complete search history.

(56) References Cited

U.S. PATENT DOCUMENTS

| | | | |
|---|---|---|---|
| 7,086,514 B2 * | 8/2006 | Langston | F16D 41/125 192/113.32 |
| 2003/0010596 A1 | 1/2003 | Kitaori et al. | |
| 2010/0230226 A1 * | 9/2010 | Prout | F16D 41/125 192/43.1 |
| 2015/0105205 A1 | 4/2015 | Kurosaki et al. | |
| 2016/0250917 A1 | 9/2016 | Shibata et al. | |

FOREIGN PATENT DOCUMENTS

| | | |
|---|---|---|
| JP | 2002340071 A | 11/2002 |
| JP | 2003090369 A | 3/2003 |
| JP | 2008-082478 A | 4/2008 |
| JP | 2015-077846 A | 4/2015 |

\* cited by examiner

*Primary Examiner* — Jacob S. Scott
*Assistant Examiner* — Ryan P Dodd
(74) *Attorney, Agent, or Firm* — Hunton Andrews Kurth LLP (57) ABSTRACT

A selectable one-way clutch includes: a pocket plate provided with one side surface where a plurality of housing recesses is formed, each housing recess housing a plate-shaped engagement piece; a hollow disk-shaped notch plate disposed to face to the one side surface of the pocket plate, configured to rotate relative to the pocket plate, and including an engagement recess formed on a surface of the notch plate facing to the housing recess and a first communication groove communicating from the engagement recess to an outer peripheral side of the notch plate; a resilient member disposed between a bottom portion of the housing recess and the engagement piece to urge the engagement piece toward the notch plate; and a selector plate provided between the pocket plate and the notch plate to switch between storage of the engagement piece and release of the engagement piece.

3 Claims, 7 Drawing Sheets

SELECTABLE ONE-WAY CLUTCH

CROSS-REFERENCE TO RELATED APPLICATION(S)

The present application claims priority to and incorporates by reference the entire contents of Japanese Patent Application No. 2016-001683 filed in Japan on Jan. 7, 2016.

BACKGROUND OF THE INVENTION

1. Field of the Invention
The disclosure relates to a selectable one-way clutch.
2. Description of the Related Art
As a one-way clutch, a selectable one-way clutch is known which is configured so that a selector plate disposed between a pocket plate and a notch plate can switch a strut (engagement piece) of the pocket plate and a notch (engagement recess) of the notch plate between an engagement state and a non-engagement state. For example, in JP 2015-077846 A, a selectable one-way clutch is disclosed which is used as a brake mechanism of an overdrive (OD) lock, and in which lubricant is supplied.

Here, the selectable one-way clutch is configured so that the strut of the pocket plate is engaged with the notch of the notch plate into the engagement state. However, in the selectable one-way clutch disclosed in JP 2015-077846 A, the lubricant remains in the notch, the strut raised is pushed back owing to the lubricant in the notch, and the strut may not normally be engaged with the notch.

SUMMARY OF THE INVENTION

It is an object of the present invention to at least partially solve the problems in the conventional technology.

According to one aspect of the disclosure, there is provided a selectable one-way clutch including: a pocket plate provided with one side surface where a plurality of housing recesses is formed, each housing recess housing a plate-shaped engagement piece; a hollow disk-shaped notch plate disposed to face to the one side surface of the pocket plate, configured to rotate relative to the pocket plate, and including an engagement recess formed on a surface of the notch plate facing to the housing recess and a first communication groove communicating from the engagement recess to an outer peripheral side of the notch plate; a resilient member disposed between a bottom portion of the housing recess and the engagement piece to urge the engagement piece toward the notch plate; and a selector plate provided between the pocket plate and the notch plate to switch between storage of the engagement piece and release of the engagement piece.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Embodiments of the disclosure will be described below with reference to the drawings. Note that, in all drawings of the following embodiments, the same or corresponding portions are denoted by the same reference signs. Furthermore, the disclosure is not limited to the embodiments described below. Furthermore, components in the following embodiments include components readily replaced by a person skilled in the art, or components substantially equivalent.

First Embodiment

Figure 1:
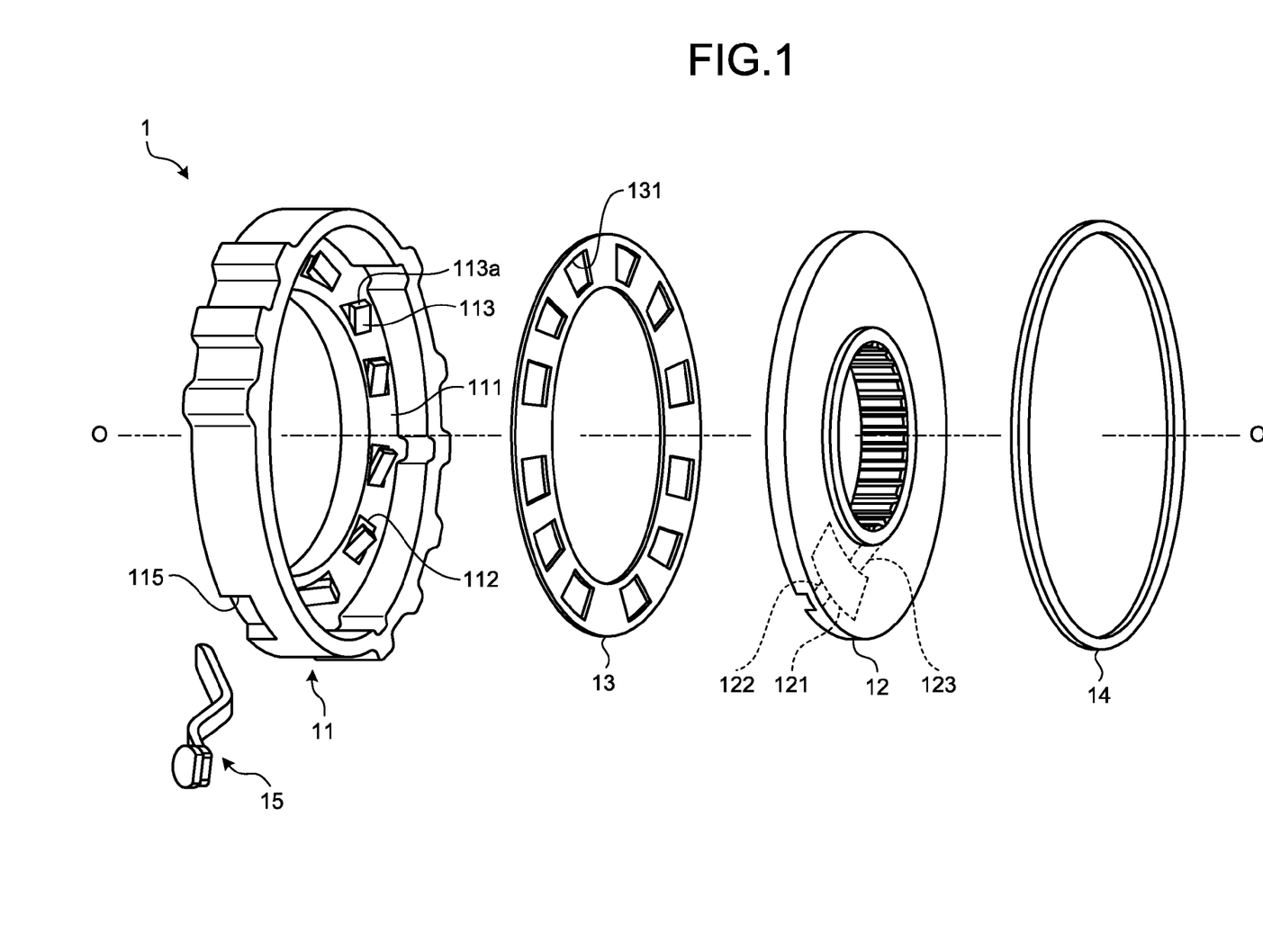
FIG. 1 is a schematic exploded perspective view of a configuration of a selectable one-way clutch according to a first embodiment of the disclosure.
Figure 2:
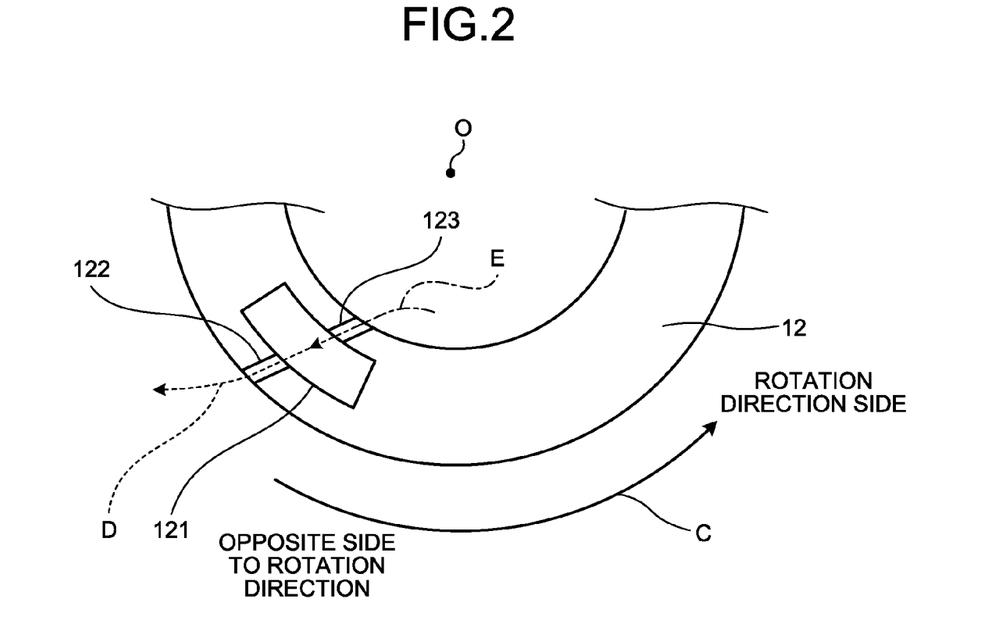
FIG. 2 is a schematic plan view of a configuration of a notch plate according to the first embodiment of the disclosure.
Figure 3:
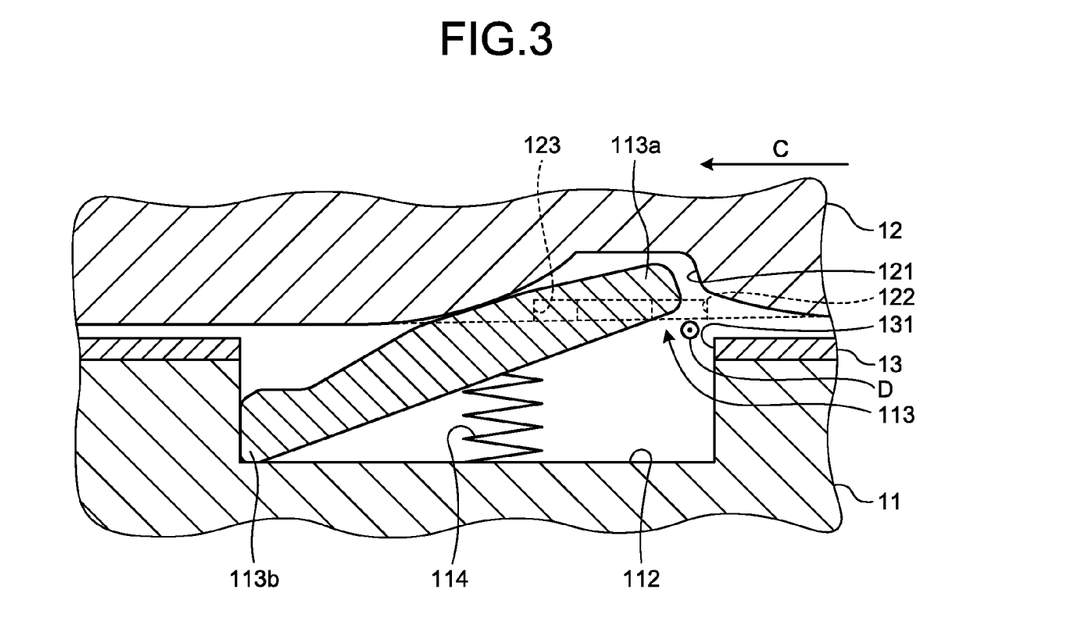
FIG. 3 is a schematic cross-sectional view of a configuration of the selectable one-way clutch according to the first embodiment of the disclosure.
Figure 4:
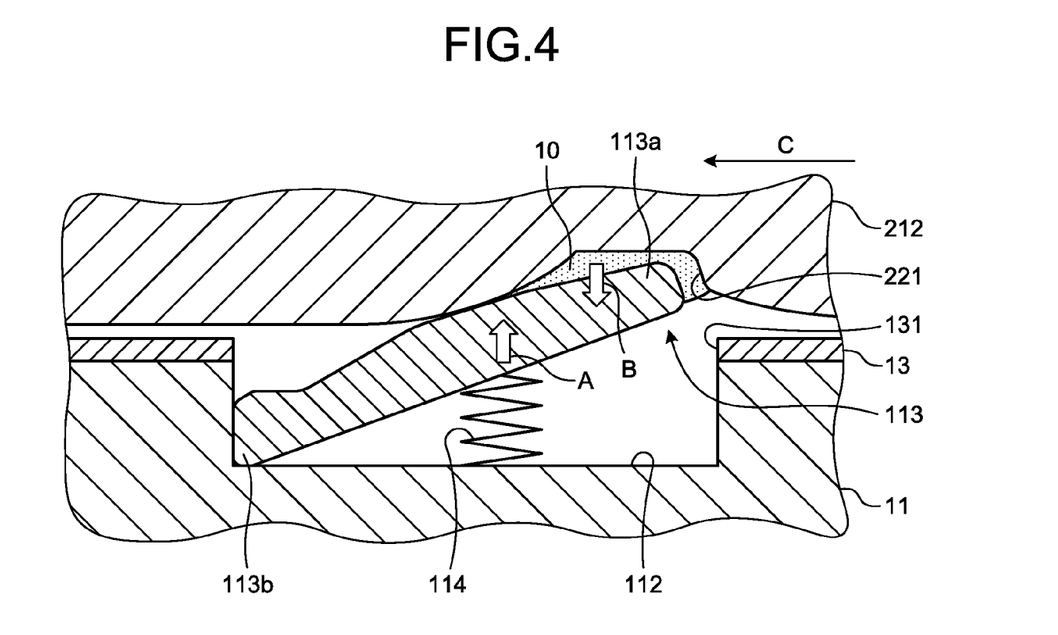
FIG. 4 is a schematic cross-sectional view of a configuration of a conventional selectable one-way clutch.
Figure 5:
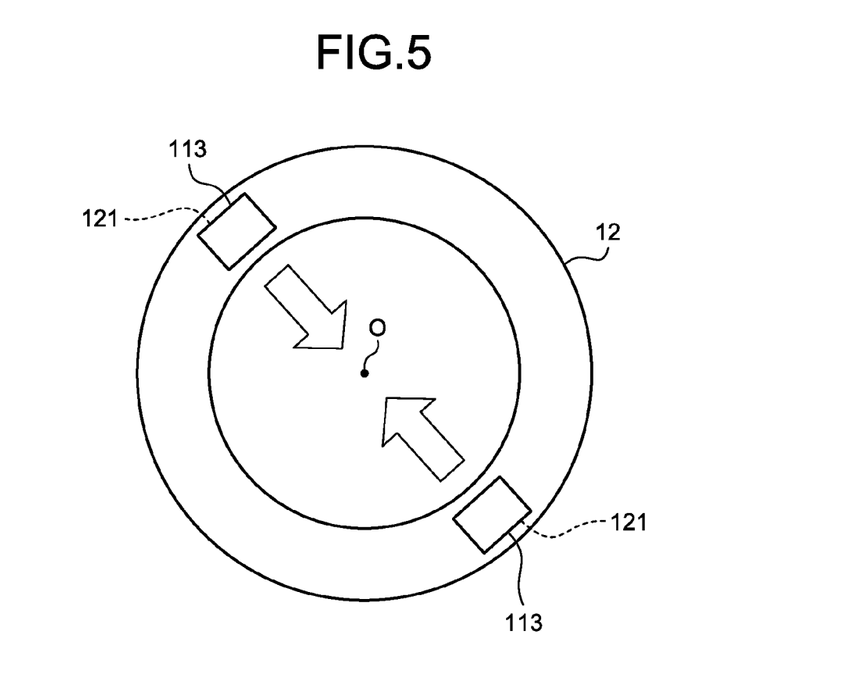
FIG. 5 is a schematic diagram describing a radial load acting on a selectable one-way clutch.

First, a selectable one-way clutch (SOWC) according to a first embodiment of the disclosure will be described. FIG. 1 illustrates the SOWC according to the first embodiment. FIG. 2 is a plan view of a notch plate of the SOWC according to the first embodiment. FIG. 3 illustrates a configuration of a notch portion of the SOWC according to the first embodiment. FIG. 4 illustrates a configuration of a notch portion of a conventional SOWC, and FIG. 5 illustrates a radial load acting on an SOWC.

As illustrated in FIG. 1, the SOWC 1 includes a pocket plate 11, a notch plate 12, a selector plate 13, a snap ring 14, and an arm 15. The SOWC 1 is used for, for example, a power transmission device in a vehicle. The SOWC 1 rotates a switching member (selector plate) by a predetermined angle to switch between an engagement (lock) state and a non-engagement (unlock) state.

The pocket plate 11 is formed into a cylindrical shape, and has an annular (hollow disk shaped) flange portion 111 provided at one end of the cylinder in a direction of an axis O to extend to the inner peripheral side thereof. The selector plate 13 and the notch plate 12 are sequentially disposed in the flange portion 111, and at last, the snap ring 14 is mounted thereto, and the pocket plate 11, the selector plate 13, and the notch plate 12 are integrally assembled. Between the pocket plate 11, the selector plate 13, and the notch plate 12, lubricant for lubrication is supplied, by a mechanical oil pump (MOP) (not illustrated). Note that, the axis O described above is a rotation axis indicated by a dash-dot line in FIG. 1.

The pocket plate 11 has an outer periphery in which a notched portion 115 is formed. The arm 15 is inserted into the notched portion 115, and the arm 15 and the selector plate 13 are connected.

A plurality of pockets 112, each being a housing recess recessed in the direction of the axis O (plate thickness direction) are formed on one side surface of the pocket plate 11. That is, a portion of the flange portion 111 facing to the selector plate 13 has a surface where the plurality of pockets 112 are formed. In each of the pockets 112, a plate-shaped strut 113 is housed as an engagement piece. The pockets 112, equal in number to the number of notches 121, are formed at positions of the flange portion 111, corresponding to the notches 121 of the notch plate 12 described below. Furthermore, as illustrated in FIG. 3, a resilient member 114 for urging the strut 113 toward the notch plate 12 is provided between a bottom portion of the pocket 112 and the strut 113.

The strut 113 is disposed in each of the pockets 112. When the selector plate 13 is rotated, the strut 113 is changed in attitude between a state in which one end portion 113a of the strut 113 is raised toward the notch 121 and another end portion 113b of the strut 113 is fitted into the pocket 112, and a state in which the strut 113 is wholly fitted in the pocket 112. That is, storage of the strut 113 in the pocket 112 and release of the strut 113 from the pocket 112 are switched by the rotation of the selector plate 13. Note that, in FIG. 3, an arrow C indicates a direction in which the notch plate 12 is rotated upon engagement of the SOWC 1.

As illustrated in FIG. 1, the notch plate 12 is formed into an annular shape (hollow disk shape) having an outer diameter equal to that of the flange portion 111 of the pocket plate 11. The notch plate 12 is disposed to face to a surface where the pockets 112 of the pocket plate 11 are formed. The notch plate 12 is configured to be rotatable about the axis O relative to the pocket plate 11, with the axis O as a rotation center.

The notch plate 12 has a surface facing to the pocket plate 11 and the pocket 112, and in the surface, a plurality of notches 121 each recessed in a direction of the axis O (plate thickness direction) is formed as an engagement recess. The notch 121 is a recessed portion in which one end portion 113a of the strut 113 raised toward the notch 121 through a window hole 131 of the selector plate 13 enters. Note that, FIG. 1 illustrates only one notch 121, but the notches 121, equal in number to the number of pockets 112 and struts 113, are actually formed at positions corresponding to the pockets 112 and the struts 113.

The selector plate 13 as the switching member is formed into an annular hollow disk shape having an outer diameter and an inner diameter equal to those of the flange portion 111 of the pocket plate 11. The selector plate 13 is disposed to face to the pocket plate 11 and the notch plate 12. The selector plate 13 is configured to be rotatable about the axis O by a predetermined angle, coaxially with the pocket plate 11 and the notch plate 12. In the selector plate 13, the window hole 131 penetrating in a direction of the axis O (plate thickness direction) is formed at a position corresponding to a pocket 112 of the pocket plate 11 and the strut 113.

The window holes 131, equal in number to the number of pockets 112 and struts 113, are formed at positions corresponding to the pockets 112 and the struts 113. As illustrated in FIG. 3, when the window hole 131 is aligned with the position of the strut 113, the one end portion 113a of the strut 113 is pressed by the resilient member 114, and raised toward the notch plate 12 through the window hole 131. Thus, an engagement state is generated in which the one end portion 113a of the strut 113 is engaged with the notch 121. In contrast, when the window hole 131 is displaced from the position of the strut 113, a portion of the selector plate 13 in which no window hole 131 is formed closes the pocket 112. Therefore, the strut 113 is pressed into the pocket 112 as a whole by the selector plate 13, and a non-engagement state is generated.

Note that, the "engagement state" described above represents a state in which the strut 113 of the pocket plate 11 and the notch 121 of the notch plate 12 are engaged with each other, and torque is transmitted between the pocket plate 11 and the notch plate 12. In the engagement state, the notch plate 12 can be rotated only in any one direction relative to the pocket plate 11, and the notch plate 12 cannot be rotated in the other direction.

In contrast, the "non-engagement state" described above represents a state in which the engagement between the strut 113 of the pocket plate 11 and the notch 121 of the notch plate 12 is released, and torque is not transmitted between the pocket plate 11 and the notch plate 12. In the non-engagement state, the notch plate 12 can be rotated in any direction relative to the pocket plate 11.

The snap ring 14 is a ring for integrally assembling the pocket plate 11, the selector plate 13, and the notch plate 12, as described above. The snap ring 14 is formed into an annular hollow disk shape having an outer diameter equal to that of the flange portion 111 of the pocket plate 11.

The arm 15 transmits a drive force of an external actuator to the selector plate 13. The arm 15 is inserted into the notched portion 115 of the pocket plate 11 to be connected to the selector plate 13. A front end of the arm 15 exposed from the notched portion 115 is connected to the actuator (not illustrated). When the actuator is driven, the arm 15 is moved, and the selector plate 13 is rotated.

Here, as illustrated in FIG. 4, in the conventional SOWC, when the strut 113 is raised, by action of the resilient member 114, toward a notch plate 212 in a direction indicated by an arrow A, the strut 113 is pushed, by lubricant 10 remaining in a notch 221, in a direction indicated by an arrow B in which engagement of the strut 113 is released. Thus, rising of the strut 113 is inhibited, the strut 113 and the notch 221 are not normally engaged with each other, and engagement failure is likely to occur.

Furthermore, as illustrated in FIG. 5, when the strut 113 is engaged with the notch 121, for example, the struts 113 and the notches 121 are engaged with each other at two opposite places in a radial direction (double meshing), loads acting on engagement positions in radial directions (radial loads) are balanced, and a resultant force of the radial loads is 0. In contrast, as the conventional SOWC illustrated in FIG. 4, when the strut 113 and the notch 221 are not normally engaged with each other, the struts 113 and the notches 221 cannot be engaged with each other at the two opposite places in the radial directions, and for example engagement only at one place (single meshing) occurs. In that case, the radial loads in the engagement positions are not balanced, and for example an excessive radial load may be applied to a component such as a bearing. Note that, in order to solve this problem, the amount of lubricant to be supplied to the SOWC can be reduced, but in that case, reduction of the amount of lubricant 10 may additionally cause seizure of components such as gears or bearings.

Figure 6:
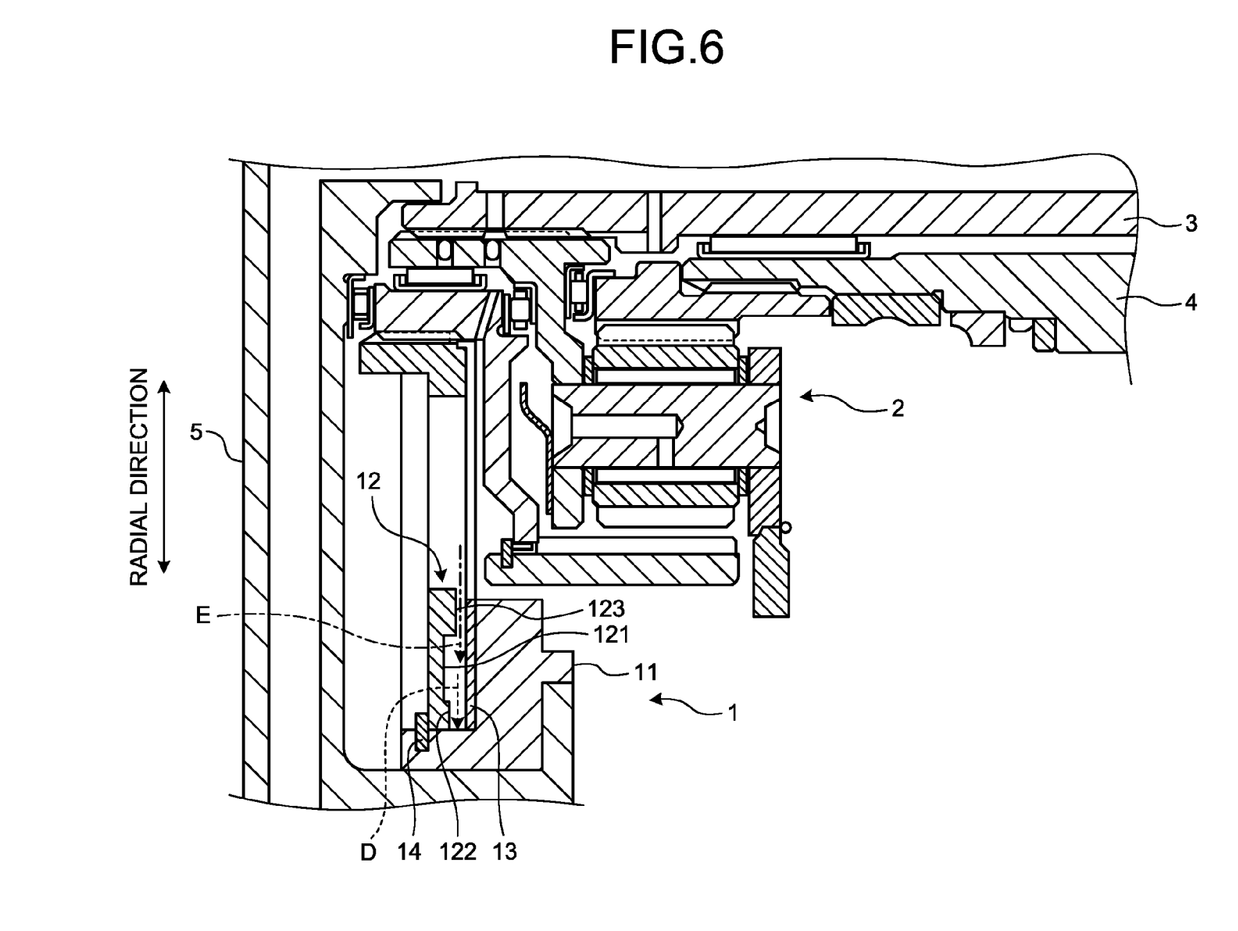
FIG. 6 is a schematic cross-sectional view of a configuration of a power transmission device including the selectable one-way clutch according to the first embodiment of the disclosure.

Therefore, in the first embodiment, the notch plate 12 illustrated in FIGS. 1 and 2 is used. FIG. 2 is a plan view of the notch plate 12 illustrated in FIG. 1, and is a bird's eye view of the notch plate 12 viewed from above from a side of the pocket plate 11. Furthermore, FIG. 6 illustrates a configuration of the power transmission device including the SOWC 1 illustrated in FIG. 1.

As illustrated in FIGS. 1, 2, and 3, in the SOWC 1 according to the first embodiment, an outlet groove 122 as the first communication groove communicating between the notch 121 and the outer periphery of the notch plate 12 is formed outwardly in a radial direction of the notch plate 12 relative to the notch 121. The outlet groove 122 is a groove discharging the lubricant 10 in the notch 121 from the inside of the notch 121 to the outer peripheral side of the notch plate 12 by a centrifugal force caused by the rotation of the notch plate 12 (arrow C in FIG. 2). Note that, in the present specification, the notch plate 12 rotates in a direction indicated by the arrow C in FIGS. 2 and 3, when the SOWC 1 is in the engagement state.

The outlet groove 122 is formed toward the outer peripheral side of the notch plate 12 from the notch 121 to communicate between the notch 121 and the outer peripheral side of the notch plate 12. That is, the outlet groove 122 has no portion extending toward an inner peripheral side of the notch plate 12 from the outer peripheral side of the notch plate 12 in a path of the communication groove 122 from the notch 121 to the outer peripheral side of the notch plate 12. In other words, the outlet groove 122 is formed so that a distance from the rotation center (axis O) of the notch plate 12 to the outlet groove 122 monotonically increases as the outlet groove 122 extends from the notch 121 toward the outer peripheral side of the notch plate 12. In the present specification, "monotonically increase" represents monotone increasing in the broad sense, and is also referred to as monotone non-decreasing. In the present first embodiment, the outlet groove 122 has a substantially linear shape when viewed from above in a direction of the axis O being a rotation axis of the notch plate 12, that is, viewed from an upper side (toward the drawing), and the outlet groove 122 has a longitudinal direction oblique with respect to a radial direction of the notch plate 12. The outlet groove 122 extends opposite to the rotation direction (arrow C) while extending toward the outside of the notch plate 12. Thus, the lubricant 10 can be readily moved from inside the outlet groove 122 to the outer peripheral side of the notch plate 12, by the centrifugal force, discharge efficiency of the lubricant 10 can be improved, and the engagement failure between the pocket plate 11 and the notch plate 12 can be inhibited. Furthermore, since the outlet groove 122 is provided, the lubricant 10 remaining in the notch 121 can be discharged to the outer peripheral side of the notch plate 12 on an inner peripheral side of the pocket plate 11. In a sliding portion between an inner peripheral side surface of the pocket plate 11 and an outer peripheral side surface of the notch plate 12, a larger amount of lubricant 10 is preferably employed for sliding. Therefore, the lubricant 10 is discharged from inside the notch 121 of the notch plate 12 by the centrifugal force, a lubrication state between the outer peripheral side surface of the notch plate 12 and the inner peripheral side surface of the pocket plate 11 can be improved.

Furthermore, an air inlet groove 123 is formed inward from the notch 121 of the notch plate 12, as a second communication groove communicating between the notch 121 and the inner periphery of the notch plate 12. Formation of the air inlet groove 123 allows air to flow into the notch 121, as indicated by an arrow E of FIG. 2, in order to discharge the lubricant 10 remaining in the notch 121 from inside the notch 121, as indicated by an arrow D of FIG. 2. Thus, the inflow air pushes the lubricant 10 remaining in the notch 121, the lubricant 10 can be efficiently discharged to the outer peripheral side of the notch plate 12, and the engagement failure between the pocket plate 11 and the notch plate 12 can be further inhibited.

The air inlet groove 123 has a substantially linear shape, when viewed from above (toward the drawing) the notch plate 12, and the air inlet groove 123 has a longitudinal direction oblique with respect to the radial direction of the notch plate 12. The air inlet groove 123 extends opposite to the rotation direction (arrow C) while extending toward the outside of the notch plate 12. Thus, air readily passes through the air inlet groove 123, and air inlet efficiency of the notch 121 can be improved. Note that, the air inlet groove 123 may not be provided, and in that configuration, air flows in from a gap between the notch plate 12 and the pocket plate 11.

As illustrated in FIG. 6, the SOWC 1 is incorporated into a power transmission mechanism including a planetary gear mechanism 2, an input shaft 3 through which power is input from an engine (not illustrated), a rotor shaft 4 of a motor (not illustrated), a rear case 5 configured to house components, and the like. While the SOWC 1 is incorporated into the power transmission mechanism, the lubricant 10 in the notch 121 is discharged from a side surface portion of the notch 121 to the outside of the notch 121, that is, to the outer peripheral side of the notch plate 12, through the outlet groove 122. Furthermore, air flows into the notch 121 from an inner peripheral side of the notch plate 12 having the hollow disk shape, through the air inlet groove 123. Thus, the lubricant 10 in the notch 121 is pushed outside the notch 121, toward the outer peripheral side along the radial direction of the notch plate 12.

As described above, in the SOWC 1 according to the first embodiment, when the strut 113 is raised to be engaged with the notch 121, the lubricant 10 remaining in the notch 121 can be discharged outside the notch 121, through the outlet groove 122 communicating with the notch 121. Accordingly, the amount of lubricant 10 in the notch 121 inhibiting the rising of the strut 113 is reduced, rising failure of the strut 113 is inhibited, and possibility of the engagement failure can be reduced. Thus, the engagement failure between the pocket plate 11 and the notch plate 12 can be inhibited. Furthermore, reduction of the amount of lubricant 10 to be supplied to the SOWC 1 is not required, and the possibility of the seizure of components, such as gears or bearings, caused by the reduced amount of lubricant 10 can be reduced.

Second Embodiment

Figure 7:
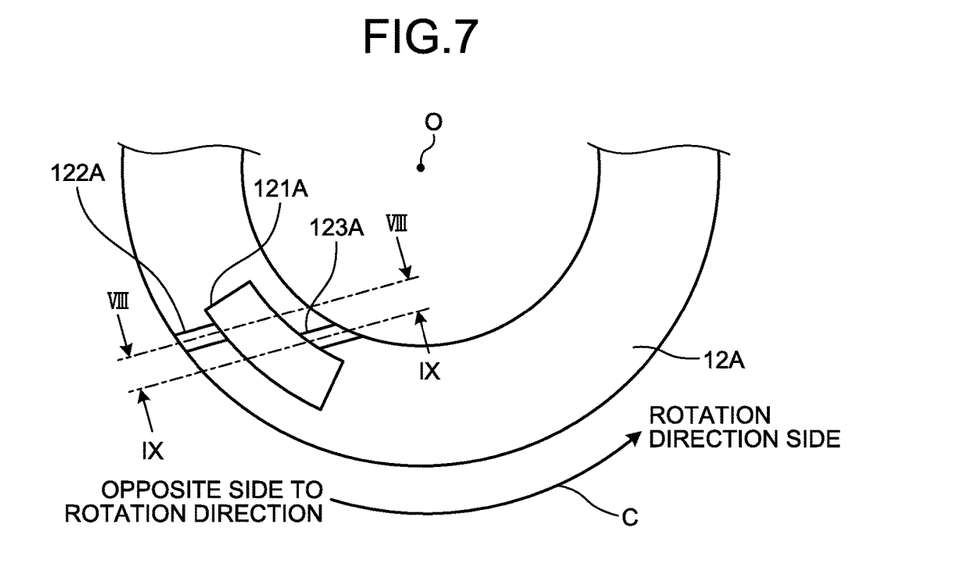
FIG. 7 is a schematic plan view of a configuration of a notch plate according to a second embodiment of the disclosure.
Figure 8:
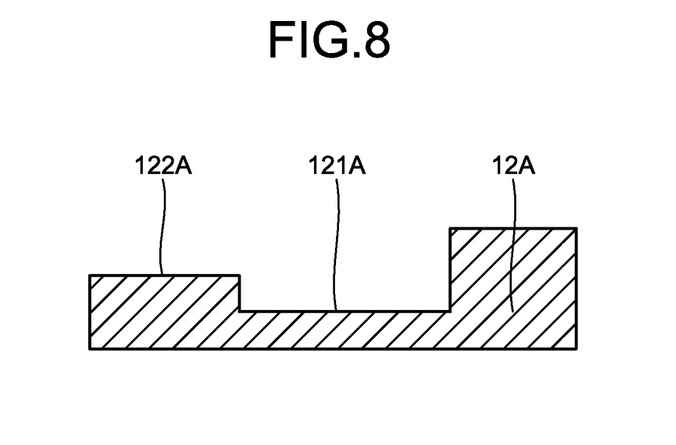
FIG. 8 is a cross-sectional view of the notch plate of FIG. 7, taken along the line VIII-VIII.
Figure 9:
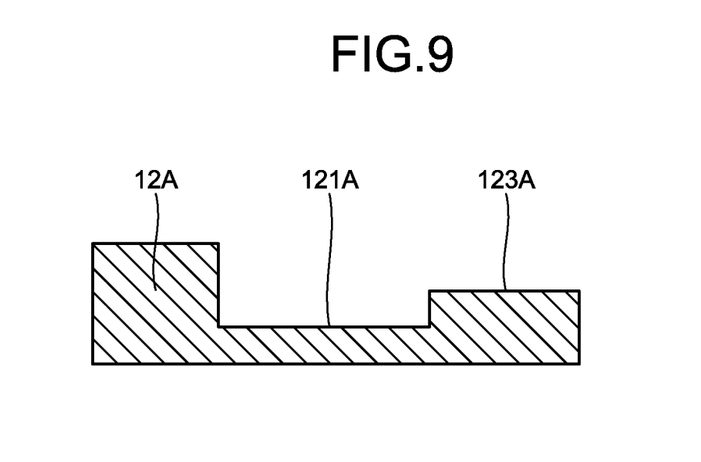
FIG. 9 is a cross-sectional view of the notch plate of FIG. 7, taken along the line IX-IX.

Next, an SOWC according to a second embodiment of the disclosure will be described. FIG. 7 illustrates a configuration of a notch plate according to the second embodiment. Furthermore, FIG. 8 is a cross-sectional view of the notch plate taken along the line VIII-VIII of FIG. 7, and FIG. 9 is a cross-sectional view of the notch plate taken along the line IX-IX of FIG. 7. Note that, in FIG. 8, the line VIII-VIII also serves as a longitudinal axis of an outlet groove, and the line IX-IX also serves as a longitudinal axis of an air inlet groove.

As illustrated in FIGS. 7 and 8, in a notch plate 12A of the SOWC 1 according to the second embodiment, an outlet groove 122A communicating between a notch 121A and an outer peripheral side of the notch plate 12A is formed, similarly to that of the first embodiment. Furthermore, as illustrated in FIGS. 7 and 9, an air inlet groove 123A is formed which communicates between the notch 121A and an inner peripheral side of the notch plate 12A.

As illustrated in FIG. 7, in the second embodiment, the outlet groove 122A and the air inlet groove 123A each have a substantially linear shape, when viewed from above in a direction of a rotation axis of the notch plate 12A (axis O). Furthermore when viewed from above in the rotation axis direction, the longitudinal axis (line IX-IX) of the air inlet groove 123A is displaced to the rotation direction of the notch plate 12A (arrow C in FIG. 7) relative to the axis of the outlet groove 122A (the line VIII-VIII). The other configurations are similar to those of the first embodiment.

According to the second embodiment, when the notch plate 12A is rotated, air flows into the notch 121A at first, along the rotation direction through the air inlet groove 123A. The air flowing into the notch 121A sweeps the inside of the notch 121A to the outlet groove 122A, and then, is discharged to the outside through the outlet groove 122A. The sweeping by the air discharges the lubricant 10 in the notch 121A through the outlet groove 122A. As described above, air suction/discharge performance of the notch 121A can be improved, and the lubricant 10 remaining in the notch 121A can be discharged further efficiently.

Modification

Modifications of the notch plate according to the first and second embodiments of the disclosure will be described next.

First Modification

Figure 10:
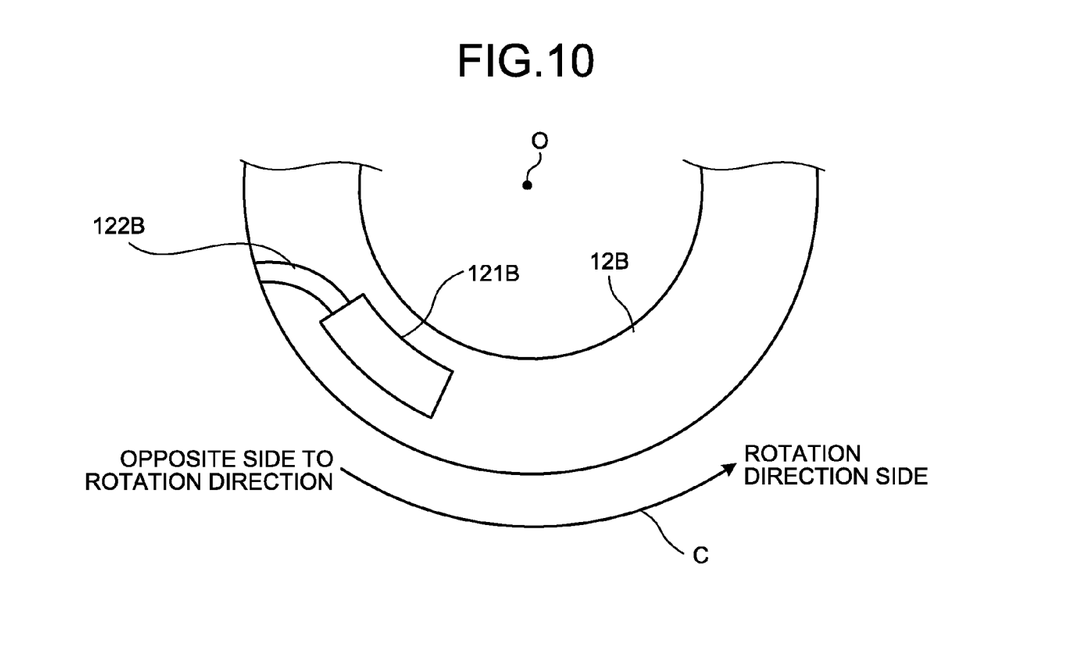
FIG. 10 is a schematic plan view of a configuration of a notch plate according to a first modification of the disclosure.

FIG. 10 is a plan view of a notch plate according to a first modification. As illustrated in FIG. 10, in a notch plate 12B according to the first modification, an outlet groove 122B is provided communicating between a side portion of a notch 121B opposite to a rotation direction of the notch plate 12B (arrow C in FIG. 10) and an outer peripheral surface of the notch plate 12B. The outlet groove 122B is formed toward the outer peripheral side of the notch plate 12B from the notch 121B to communicate between the notch 121B and the outer peripheral side of the notch plate 12B. In particular, the outlet groove 122B is formed into a curved shape extending from the side portion of the notch 121B toward the outer peripheral side of the notch plate 12B. That is, the outlet groove 122B has no portion extending toward an inner peripheral side of the notch plate 12B from the outer peripheral side of the notch plate 12B in a path of the communication groove 122B from the notch 121B to the outer peripheral side of the notch plate 12B. In other words, the outlet groove 122B is formed so that a distance from a rotation center (axis O) of the notch plate 12B to the outlet groove 122B monotonically increases as the outlet groove 122B extends from the notch 121B toward the outer peripheral side of the notch plate 12B. Thus, the outlet groove 122B has no path extending inward along a radial direction of the notch plate 12B, and when the notch plate 12B is rotated, a centrifugal force acting on the lubricant 10 can discharge the lubricant 10 outside the notch plate 12B. This is because the centrifugal force is considered to be extremely larger than the other forces acting on the lubricant.

Second Modification

Figure 11:
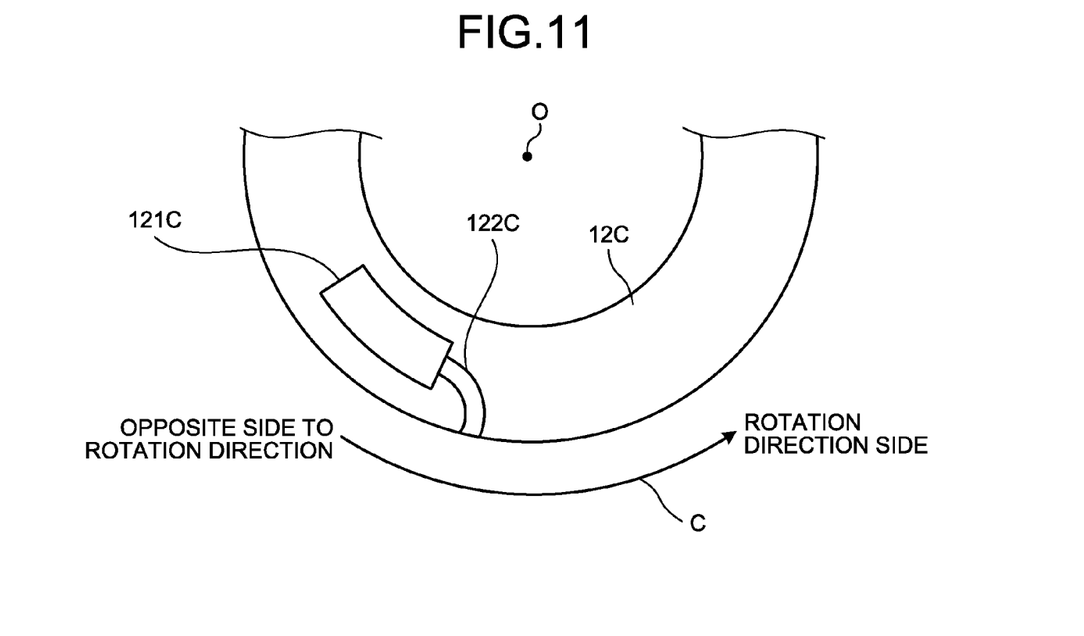
FIG. 11 is a schematic plan view of a configuration of a notch plate according to a second modification of the disclosure.

FIG. 11 is a plan view of a notch plate according to a second modification. As illustrated in FIG. 11, in a notch plate 12C according to the second modification, an outlet groove 122C is formed toward the outer peripheral side of the notch plate 12C from a notch 121C to communicate between the notch plate 12C and the outer peripheral side of the notch plate 12C. In particular, the outlet groove 122C is formed into a curved shape communicating between a side portion of the notch 121C in the rotation direction of the notch plate 12C (arrow C in FIG. 11) and an outer peripheral surface of the notch plate 12C. That is, the outlet groove 122C has no portion extending toward an inner peripheral side of the notch plate 12C from the outer peripheral side of the notch plate 12C in a path of the communication groove 122C from the notch 121C to the outer peripheral side of the notch plate 12C. In other words, the outlet groove 122C is formed so that a distance from a rotation center (axis O) of the notch plate 12C to the outlet groove 122C monotonically increases as the outlet groove 122C extends from the notch 121C toward the outer peripheral side of the notch plate 12C. Thus, similarly to the first modification, when the notch plate 12C is rotated, the lubricant 10 can be moved to the outlet groove 122C at the side portion of the notch 121C by a centrifugal force acting on the lubricant 10. Accordingly, the lubricant 10 can be efficiently discharged outside the notch plate 12C, through the outlet groove 122C.

The embodiments of the disclosure have been specifically described above, but the disclosure is not limited to the embodiments described above, and various modifications may be made within the technical scope of the disclosure. For example, numerical values described in the above embodiments are by way of example only, and a numerical value different from the above-mentioned numerical values may be used if necessary. Furthermore, various changes, modifications, and the like made based on these descriptions are included in the spirit and scope of the disclosure.

According to the embodiments of the disclosure, when the notch plate is rotated, a centrifugal force acting on the lubricant remaining in the engagement recess can discharge the lubricant outside the engagement recess, through the first communication groove formed in the notch plate, and the lubricant in the engagement recess inhibiting the rising of the engagement piece is reduced in amount. Therefore, rising failure of the engagement piece is inhibited, and engagement failure between the pocket plate and the notch plate can be inhibited.

According to the embodiments of the disclosure, when the notch plate is rotated, air flow can be generated from the inner peripheral side of the notch plate to the outer peripheral side of the notch plate, through the engagement recess. Accordingly, when the lubricant remaining in the engagement recess is discharged outside the engagement recess through the first communication groove, discharge efficiency can be improved.

According to the embodiments of the disclosure, when the notch plate is rotated, air suction/discharge performance can be improved in the rotation direction, and the lubricant remaining in the engagement recess can be further efficiently discharged.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A selectable one-way clutch comprising:
    a pocket plate provided with one side surface where a plurality of housing recesses is formed, each housing recess housing a plate-shaped engagement piece;
    a hollow disk-shaped notch plate disposed to face to the one side surface of the pocket plate, configured to rotate relative to the pocket plate, and including an engagement recess formed on a surface of the notch plate facing to the housing recess and a first communication groove communicating from the engagement recess to an outer peripheral side of the notch plate;

a resilient member disposed between a bottom portion of the housing recess and the engagement piece to urge the engagement piece toward the notch plate; and a selector plate provided between the pocket plate and the notch plate to switch between storage of the engagement piece and release of the engagement piece.

2. The selectable one-way clutch according to claim 1, wherein the notch plate includes a second communication groove communicating between the engagement recess and an inner peripheral side of the notch plate.

3. The selectable one-way clutch according to claim 2, wherein when viewed from above in a direction of a rotation axis of the notch plate, each of the first communication groove and the second communication groove has a substantially linear shape, and the second communication groove has a longitudinal direction displaced to a rotation direction of the notch plate relative to a longitudinal direction of the first communication groove.

\* \* \* \* \*